(12) United States Patent
Kaplan et al.

(10) Patent No.: US 10,536,473 B2
(45) Date of Patent: Jan. 14, 2020

(54) SYSTEM AND METHOD FOR DETECTING ANOMALIES ASSOCIATED WITH NETWORK TRAFFIC TO CLOUD APPLICATIONS

(71) Applicant: Microsoft Technology Licensing, LLC, Redmond, WA (US)

(72) Inventors: Shai Kaplan, Tel Aviv (IL); Yonatan Most, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 15/433,058

(22) Filed: Feb. 15, 2017

(65) Prior Publication Data

US 2018/0234444 A1   Aug. 16, 2018

(51) Int. Cl.
*H04L 29/06* (2006.01)

(52) U.S. Cl.
CPC ...... *H04L 63/1425* (2013.01); *H04L 63/0281* (2013.01); *H04L 63/1441* (2013.01)

(58) Field of Classification Search
CPC ............. H04L 63/1425; H04L 63/0281; H04L 63/1441
See application file for complete search history.

(56) References Cited

U.S. PATENT DOCUMENTS

| | | | |
|---|---|---|---|
| 8,504,879 B2 * | 8/2013 | Poletto | H04L 41/064 709/224 |
| 8,793,790 B2 * | 7/2014 | Khurana | G06F 21/552 726/1 |
| 8,868,474 B2 | 10/2014 | Leung et al. | |
| 9,154,516 B1 | 10/2015 | Vaystikh et al. | |
| 9,166,993 B1 | 10/2015 | Liu | |
| 9,270,765 B2 | 2/2016 | Narayanaswamy et al. | |
| 9,298,914 B1 | 3/2016 | McCorkendale | |

(Continued)

OTHER PUBLICATIONS

"Outlier Security Launches with Industry's First SaaS Agentless Endpoint Threat Detection and Response Product"; http://www.prnewswire.com/news-releases/outlier-security-launches-with-industrys-first-saas-agentless-endpoint-threat-detection-and-response-product-278362521.html; published on: Oct. 7, 2014; 5 pages.

(Continued)

*Primary Examiner* — Chau Le
*Assistant Examiner* — Vance M Little
(74) *Attorney, Agent, or Firm* — Workman Nydegger (57) ABSTRACT

An anomaly detection system is provided and includes a processor, a memory, and a security application that is stored in the memory and includes instructions. The instructions are configured to collect information of behavior data for the users of an organization accessing cloud applications via a distributed network. The behavior data includes one or more parameters tracked over time for the users. The instructions are further configured to: establish baselines for each of the users and for each of the cloud applications or types of cloud applications of the organization; detect anomalies based on the baselines; provide aggregated anomaly data by aggregating anomalies corresponding to two or more of the baselines and a same behavior or corresponding to multiple users of a same cloud application during a same period of time; determine a risk value based on the aggregated anomaly data; and perform a countermeasure based on the risk value.

21 Claims, 4 Drawing Sheets

(56) References Cited

U.S. PATENT DOCUMENTS

| | | |
|---|---|---|
| 9,467,466 B2 | 10/2016 | Mankovskii et al. |
| 9,479,518 B1* | 10/2016 | Fang ........................ H04L 63/14 |
| 10,104,100 B1* | 10/2018 | Bogorad ............. H04L 63/1425 |
| 2007/0245420 A1 | 10/2007 | Yong et al. |
| 2010/0083054 A1* | 4/2010 | Marvasti ............. G06F 11/0709 |
| | | 714/47.2 |
| 2013/0347116 A1 | 12/2013 | Flores et al. |
| 2015/0172321 A1* | 6/2015 | Kirti ........................ H04L 63/20 |
| | | 726/1 |
| 2015/0334129 A1* | 11/2015 | Moyle ................... G06F 21/552 |
| | | 726/1 |
| 2016/0164902 A1 | 6/2016 | Moore |
| 2016/0191549 A1 | 6/2016 | Nguyen et al. |
| 2016/0203316 A1* | 7/2016 | Mace ....................... G06F 21/55 |
| | | 726/23 |
| 2016/0226901 A1 | 8/2016 | Baikalov et al. |
| 2016/0226905 A1 | 8/2016 | Baikalov et al. |
| 2016/0344762 A1* | 11/2016 | Jou ......................... G06N 7/005 |

OTHER PUBLICATIONS

"Using a Group to Manage Access to SaaS Applications"; http://docs.microsoft.com/en-us/azure/active-directory/active-directory-accessmanagement-group-saasapps; published on Nov. 1, 2016; 2 pages.

\* cited by examiner

SYSTEM AND METHOD FOR DETECTING ANOMALIES ASSOCIATED WITH NETWORK TRAFFIC TO CLOUD APPLICATIONS

FIELD

The present disclosure relates to security applications, and more particularly to detecting anomalies associated with access to cloud applications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cloud applications may be implemented via virtual machines (VMs) and or physical machines (PMs). The VMs and the PMs may be implemented in a cloud-based network. Cloud-based networks allow computer processing and storing needs to be moved from on premises networks to hybrid cloud or fully cloud-based networks while satisfying data security access requirements. The cloud applications can be accessed from client stations of organizations at remote locations.

SUMMARY

An anomaly detection system is provided and includes a processor, a memory, and a security application. The security application is stored in the memory and includes instructions, which are executable by the processor and are configured to collect information of behavior data for the users of an organization accessing one or more cloud applications via a distributed network. The behavior data includes one or more parameters tracked over time for the users. The one or more cloud applications are implemented on one or more server computers of a service provider. The instructions are further configured to: establish baselines for each of the users and for each of the one or more cloud applications or types of cloud applications of the organization; detect anomalies based on the baselines; provide aggregated anomaly data by aggregating the anomalies (i) corresponding to two or more of the baselines and a same behavior, or (ii) corresponding to multiple users of a same cloud application during a same period of time; determine a risk value based on the aggregated anomaly data; and perform a countermeasure based on the risk value.

In other features, an anomaly detection system is provided and includes a processor, a memory and a security application. The security application is stored in the memory and includes instructions, which are executable by the processor and are configured to collect information of behavior data for client computers of an organization accessing one or more cloud applications via a distributed network. The behavior data includes one or more parameters tracked over time for the client computers. The one or more cloud applications are implemented on one or more server computers of a service provider. The instructions are further configured to: establish baselines for each of the client computers and for each of the one or more cloud applications or types of cloud applications of the organization; detect anomalies based on the baselines; provide aggregated anomaly data by aggregating the anomalies (i) corresponding to two or more of the baselines and a same behavior, or (ii) corresponding to multiple client computers accessing a same cloud application during a same period of time; determine a risk value based on the aggregated anomaly data; and perform a countermeasure based on the risk value.

In other features, a non-transitory tangible computer readable medium storing instructions executable by a processor for detecting an anomaly associated with access of a cloud application is provided. The instructions are for collecting information of behavior data for users of an organization accessing one or more cloud applications via a distributed network. The behavior data includes one or more parameters tracked over time for the users. The one or more cloud applications are implemented on one or more server computers of a service provider. The instructions are further for: establishing baselines for each of the users and for each of the one or more cloud applications or types of cloud applications of the organization; detecting anomalies based on the baselines; providing aggregated anomaly data by aggregating the anomalies (i) corresponding to two or more of the baselines and a same behavior, or (ii) corresponding to multiple users of a same cloud application during a same period of time; determining a risk value based on the aggregated anomaly data; and performing a countermeasure based on the risk value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A security application (e.g., Cloud Application Security®) by Microsoft®) can be provided as a service application by a service provider and used to monitor cloud applications implemented in a cloud-based network. The security application can monitor, for example, traffic between client computers of organizations and accessed cloud applications. The security applications disclosed herein monitor information, such as data, logs, parameters, and/or risk factors associated with access of cloud applications and detect anomalies based on the information. If for example, the anomalies are determined to be a high risk and/or associated with malicious activity, then a countermeasure may be performed to prevent further similar malicious activity.

The examples set forth below include systems and methods for detecting anomalies associated with access to cloud applications. The examples include tracking activity to cloud applications and, based on the activity, detecting anomalies via a security application. The security application may be implemented in a cloud-based network and/or a network of a service provider and is used to monitor activity between (i) client computers and (ii) VMs and/or PMs of the cloud applications. The security application identifies cloud applications used by a network of an organization and provides risk scoring and risk assessment. The security application informs owners of client computers, VMs, PMs, organizations and/or service provider owners of detected anomalies, such that one or more countermeasures can then be performed.

Figure 1:
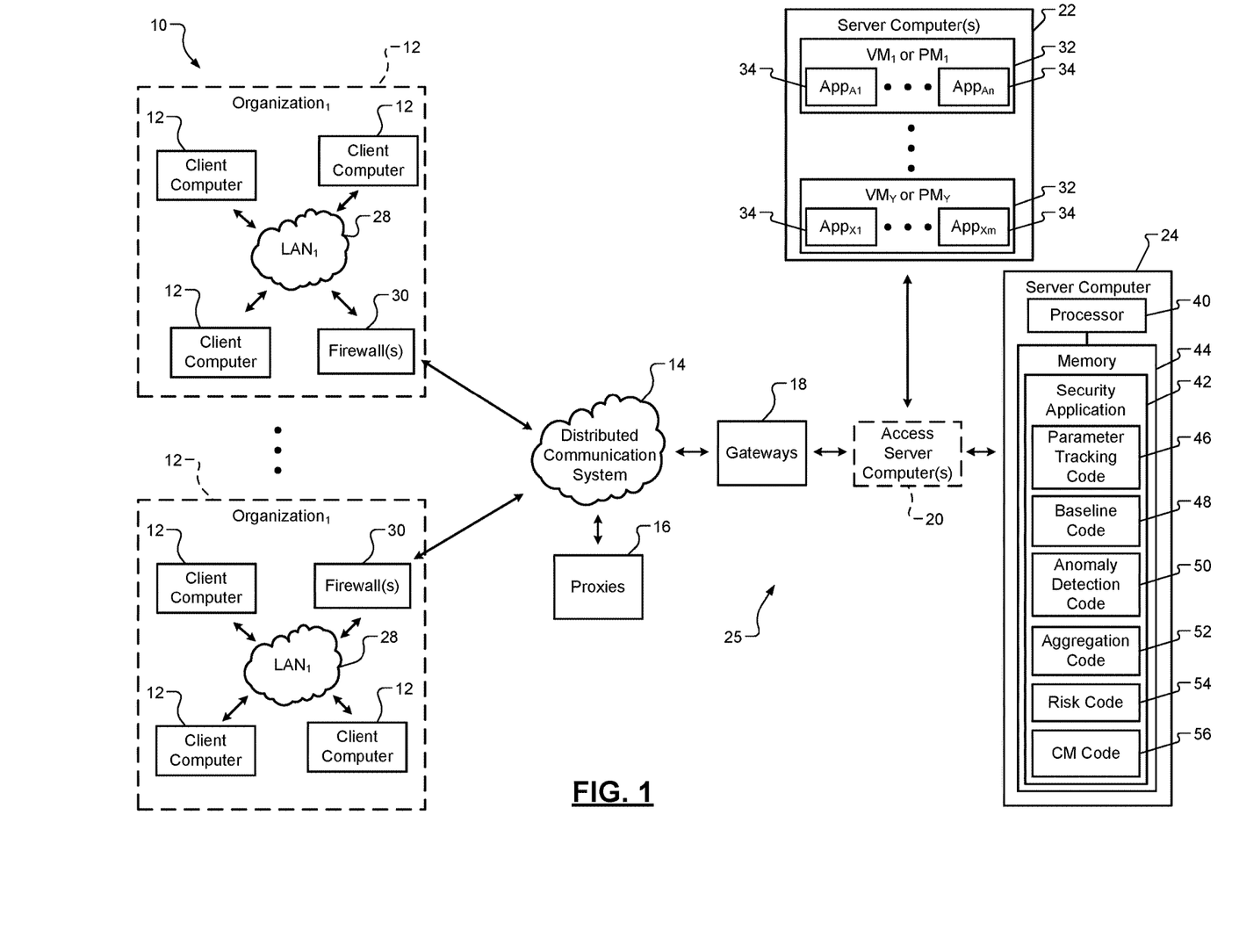
FIG. 1 is a functional block diagram of an example of a security system including a security application in accordance with an embodiment of the present disclosure.

FIG. 1 shows a security system 10 that includes client computers 12, a distributed communication system 14, proxies 16, gateways 18, one or more access server computers 20, and other server computers 22, 24. In some examples, the gateways 18, one or more access server computers 20, and one or more server computers 22 are implemented in a cloud-based network 25. In some examples, the server computer 24 is implemented in the cloud-based network 25 or in another service provider network. In another example, the access server computers 20 are not included in the security system 10 and the gateways 18 communicate directly with the server computers 22, 24. In the example shown, the client computers are owned by corresponding organizations 26. The organizations 26 may include local area networks (LANs) 28 and firewalls 30. The client computers 12 may access the distributed communication system 14 directly and/or via the LANs 28 and firewalls 30.

The cloud-based network 25 may be implemented by a cloud service provider and, in an embodiment, includes client virtual machines, network appliances and application server computers. Examples of network appliances include routers, switches, firewalls, proxy server computers, World Wide Web (or Web) server computers, wide area network (WAN) accelerators, intrusion detection system (IDS) devices, and intrusion prevention system (IPS) devices. The network appliances provide intermediary services between the application server computers and client computers. The client computers 12 can be implemented in the cloud-based network as VMs and/or PMs or can be located on premises. The network appliances and application server computers may be implemented as one or more VMs implemented in the cloud-based network.

The cloud-based network 25 may include one or more of the server computers 22, 24. The cloud-based network 25 further includes resources and/or containers that may be shared by the client computers 12. The cloud service provider provisions the resources (such as software applications having corresponding executable code, server computer processing time, and/or storage) via the cloud-based network 25. Cloud service providers implement infrastructure as a service (IaaS) and platform as a service (PaaS) using virtual machines (VMs) or containers. A container includes processing, storage and application resources. Data centers may include server computers that host the VMs or containers. Each server can host many VMs and/or containers. The VMs run on a guest operating system and interface with a hypervisor, which shares and manages server hardware and isolates the VMs. Unlike VMs, containers do not need a full OS to be installed or a virtual copy of the host server's hardware. Containers may include a few software modules and libraries and require the use of some portions of an operating system. As a result of the reduced footprint, many more containers can be deployed on a server as compared to virtual machines. The server computers 22, 24 may include VMs (e.g., $VMs_{1-Y}$ are shown), which may be implemented as PMs (e.g., $PMs_{1-Y}$). The software applications may be implemented on the server computers 22, 24, which may be referred to as physical machines.

The client computers 12 may be privately owned by different individuals and/or entities. In the example shown, the client computers 12 are owned by organizations 26. Each of the client computers 12 may access one or more cloud applications 34 stored in the server computers 22 and/or VMs 32. The organizations 26 may own and/or have paid access to corresponding ones of the VMs 32 and/or cloud applications 34. The client computers 12 may include desk/laptop computers, tablets, mobile phones, wearable devices, access terminals, and/or other network devices for accessing the cloud applications 34. Accessing of the cloud applications 34 may include: communicating with the cloud applications 34; transferring data, packets, information, etc. between the client computers 12 and the server computers 22 in association with the cloud applications 34; modifying and/or updating the cloud applications; and/or uploading and/or downloading the cloud applications 34 and/or files associated with the cloud applications 34.

The distributed communication system 14 may include routers, switches and/or other network devices for directing data and/or packets between (i) the client computers 12 and/or organizations 26 and (ii) the gateways 18. The distributed communication system 14 may include a network, such as a local area network (LAN), a wireless local area network (WLAN), and/or a wide area network (WAN) (e.g., the Internet). The proxies 16 may transfer data, packets, information, etc. between the firewalls 30 and the gateways 18. In an embodiment, the proxies 16 are implemented as part of the distributed communication system 14. The gateways 18 may transfer data, packets, information, etc. between the distributed communication system 14 and the access server computers 20. The access server computers 20 may provide access to direct communication with the server computers 22 and/or 24. In one embodiment, the access server computers 20 are implemented as client access server computers and facilitate providing services, such as services associated with software as a service (SaaS) applications, from the server computer 24 to the client computers 12. The gateways 18, the access server computers 20, the server computers 22 and/or the server computers 24 may be implemented in an internal network of a service provider that provides software applications.

The server computer 24 includes a processor 40 that executes software applications, such as a security application 42, which is stored in a memory 44. One or more of the VMs 32 may be implemented in the server computer 24. The security application 42 includes parameter tracking code 46, baseline code 48, anomaly detection code 50, aggregation code 52, risk code 54 and countermeasure (CM) code 56. During operation, the security application 42 monitors behavior of the client computers 12 and/or users of the client computers 12 directed to access of the cloud applications 34. The client computers 12 may access the security application 42 via a web browser and corresponding website. The cloud application 34 collects data, parameters, risk factors, and/or information associated with the behavior and detects anomalies. The security application 42 evaluates the anomalies and performs countermeasures (e.g., generates alerts) to prevent malicious activity based on results of the evaluation. The security application 42 displays at client computers one or more windows/pages via the web browser of statistical data associated with the information collected, the anomalies detected, models generated, and/or corresponding alerts.

The security application 42 and the code 46, 48, 50, 52, 54 and 56 are further described below with respect to the method of FIG. 4.

Figure 2:
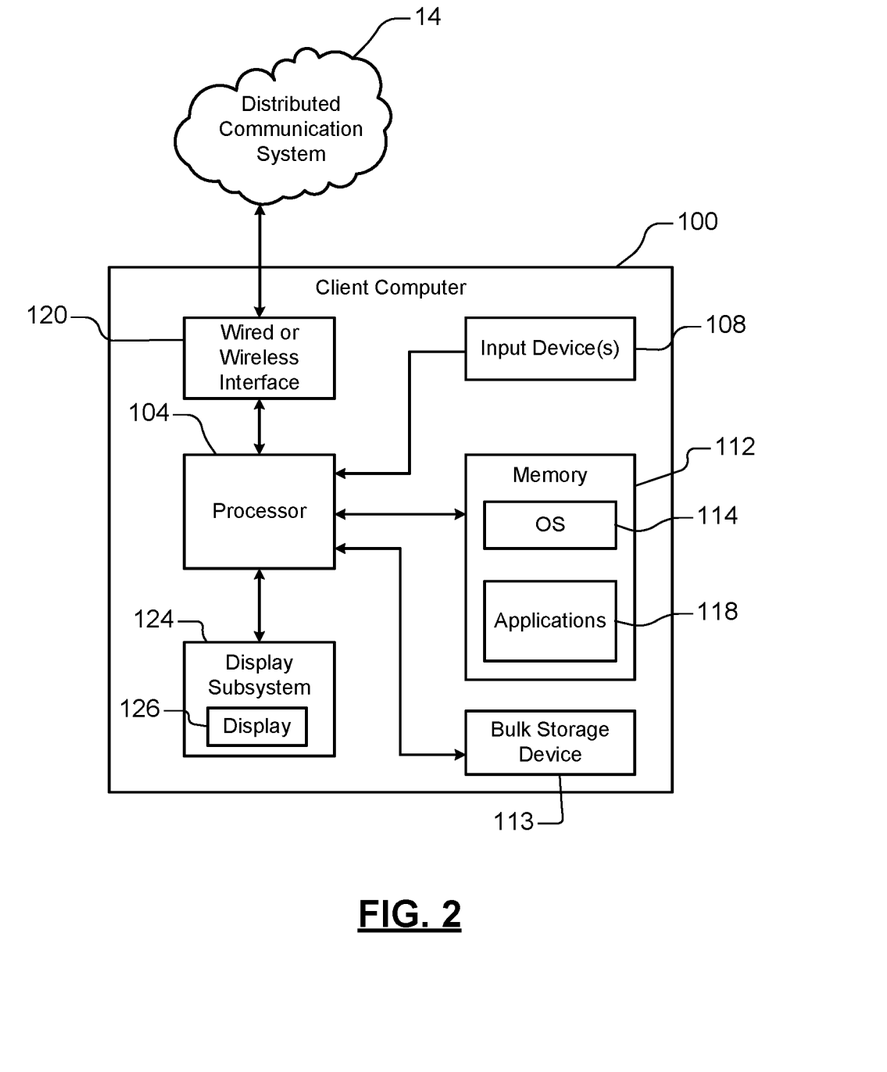
FIG. 2 a functional block diagram of an example of a client computer in accordance with an embodiment of the present disclosure.

In FIG. 2, a simplified example of a client computer 100 is shown. The client computers 12 of FIG. 1 may be implemented as the client computer 100. The client computer 100 includes a central processing unit (CPU) or processor 104 and an input device 108 such as a keypad, touchpad, mouse, etc. The client computer 100 further includes memory 112 such as volatile or nonvolatile memory, cache or other type of memory. The client computer 100 further includes bulk storage device 113 such as flash memory, a hard disk drive (HDD) or other bulk storage device.

The processor 104 of the client computer 100 executes an operating system 114 and one or more applications 118. For example, the applications 118 may include a browser. The client computer 100 further includes a wired interface (such as an Ethernet interface) and/or wireless interface (such as a Wi-Fi, Bluetooth, near field communication (NFC) or other wireless interface (collectively identified at 120)) that establishes a communication channel over the distributed communication system 14. The client computer 100 further includes a display subsystem 124 including a display 126.

Figure 3:
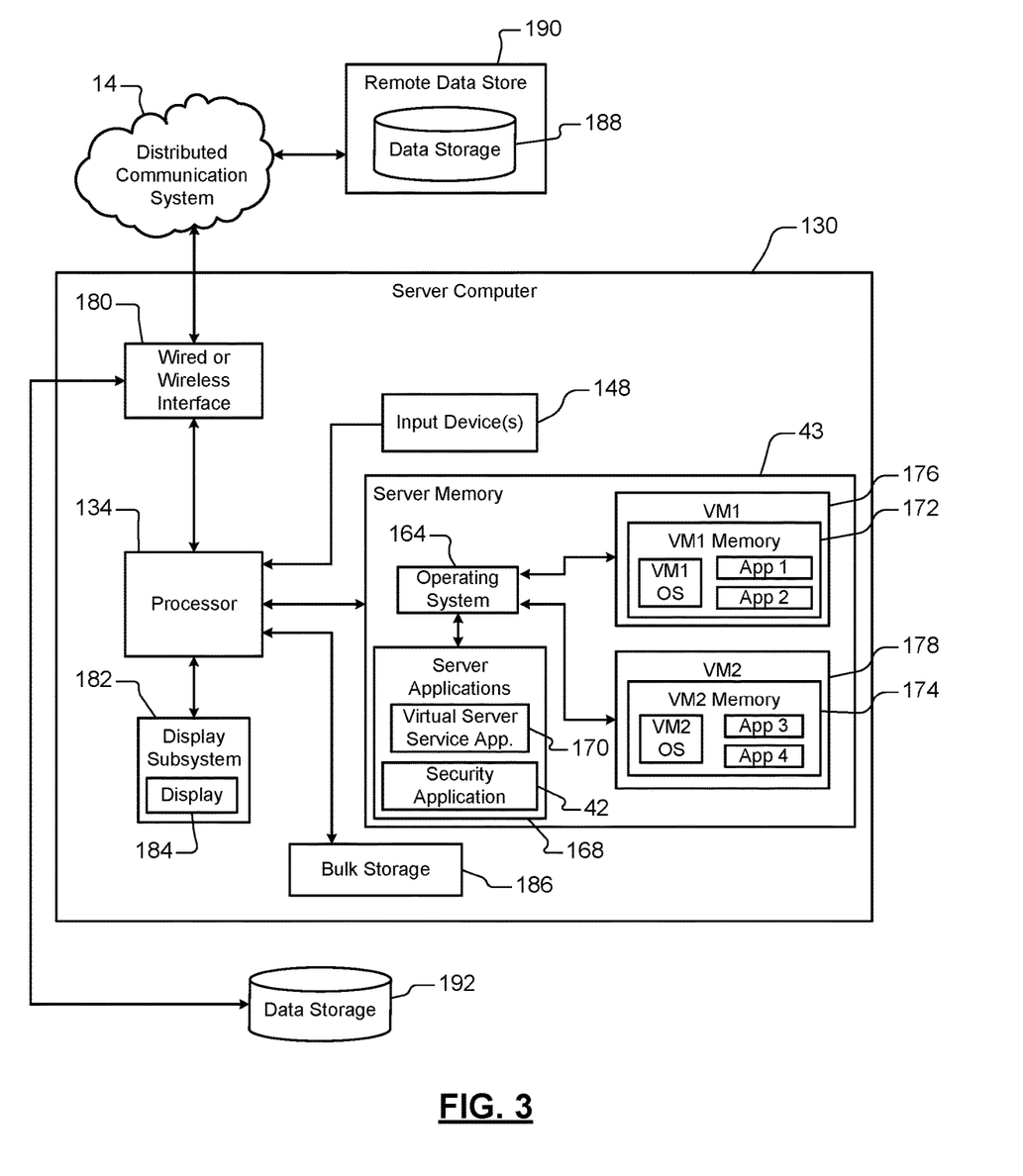
FIG. 3 is a functional block diagram of an example of a server computer incorporating applications in accordance with an embodiment of the present disclosure.

In FIG. 3, an example of a server computer 130 is shown. The server computers 20, 22, 24 of FIG. 1 may be implemented as and/or have similar architecture as the server computer 130. The server computer 130 includes one or more processors and an input device 148 such as a keypad, touchpad, mouse, etc. The server computer 130 further includes a server memory 132, such as volatile or nonvolatile memory, cache or other type of memory, and a processor 134. The processor 134 executes an operating system (OS) 164 and one or more server applications 168 and/or VM applications. Examples of server applications include the security application 42 and a virtual server service application 170, which is implemented in a virtualization layer and is executed along with the OS 164. The virtual server service application 170 creates a virtual environment in which VM (or guest) OSs (e.g., VM1 OS and VM2 OS) run. Example VM applications App 1, App 2, App 3, and App 4 are shown as being implemented in VM memories 172, 174 of VMs 176, 178, respectively. The VM applications may include instances of auto-generated websites, network appliances, storage applications, productivity applications, and/or other VM applications. VM applications App1-4 are shown as examples. Each of the VM memories may include one or more VM applications.

The server computer 130 further includes a wired or wireless interface 180 that establishes a communication channel over the distributed communication system 14. The server computer 130 further includes a display subsystem 182 that includes a display 184. The server computer 130 may further include a bulk storage device 186 such as flash memory, a hard disk drive (HDD) or other local or remote storage device. The processor 134 may also access a data storage 188 of a remote data store 190 via the interface 180 and the distributed communication system 14, or a data storage 192, such as a database, via the interface 180.

Operations of the client computers 12, proxies 16, gateways 18, server computers 20, 22, 24 and firewalls 30 of FIG. 1 are further described below with respect to the methods of FIG. 4. An example of a security method is illustrated in FIG. 4. Although the following operations are primarily described with respect to the implementations of FIG. 1, the operations may be modified to apply to other implementations of the present disclosure. The operations may be iteratively performed.

The method begins at 200 and includes execution of the security application 42 by the processor 40. At 202, the security application 42 via the parameter tracking code 46 collects data, logs, packets, risk factors, and/or other related information associated with access of cloud applications 34. The related information is tracked over time and may be stored in the proxies 16, gateways 18, and/or firewalls 30. As an example, a log of access information may include an access start time, an access end time, a duration of access, an Internet protocol (IP) address, a username, a cloud application name, an upload volume of data, a download volume of data, a number of transactions, a number of accesses, a number of accesses in a predetermined period, a geographical location where the access occurred, etc. In one embodiment, the security application 42 requests and receives the related information from the proxies 16, the gateways, 18, the access server computers 20, and/or the firewalls 30. In another embodiment, the related information is collected and monitored for a predetermined training period.

At 204, the security application 42 via the baseline code 48 determines one or more parameters and/or risk factors to monitor. This determination may be performed prior to operation 202. The selected parameters and/or risk factors may be requested from the firewalls, proxies, and/or gateways. The selected parameters and/or risk factors may include parameters and/or risk factors provided in the log of access information and/or parameters calculated based on the parameters and/or risk factors provided in the log of access information. Some examples of parameters and/or risk factors are: a user identifier; a client computer identifier; an address of the client computer; a cloud application identifier; a number of transactions between a user/client computer and one or more cloud applications; an amount of traffic between a user/client computer and one or more cloud applications; a number of transactions between a user/client computer and one or more cloud applications with a predetermined period of time; an amount of traffic between a user/client computer and one or more cloud applications within a predetermined period of time; periods of use of one or more cloud applications by a user/client computer; a total number of cloud applications accessed by a user/client computer; and a total number of cloud applications accessed by a user/client computer within a predetermined period of time.

Some of the parameters are risk factors, such as the: number of transactions between a user/client computer and one or more cloud applications; amount of traffic between a user/client computer and one or more cloud applications; number of transactions between a user/client computer and one or more cloud applications with a predetermined period of time; amount of traffic between a user/client computer and one or more cloud applications within a predetermined period of time; periods of use of one or more cloud applications by a user/client computer; total number of cloud applications accessed by a user/client computer; and total number of cloud applications accessed by a user/client computer within a predetermined period of time. Other parameters and risk factors include: country of origin of a user and/or client computer; compliance of activity performed by a user and/or client computer; and a reputation of a user and/or client computer.

The one or more parameters and/or risk factors may be for one or more users/client computers, users/client computers of an organization, a predetermined group of users/client computers, and/or one or more cloud applications. The predetermined timer periods may be for one or more days. The monitored parameters may be monitored per user, per client computer, per cloud applications and/or a combination thereof. The parameters and/or risk factors may be stored in tables in the memory 44 and accessed during the following operations.

At 206, the security application 42 via the baseline code 48 selects one or more parameterized statistical distributions (PSDs) from a family of distributions based on the one or more parameters/risk factors and domain knowledge. The domain knowledge relates the one or more parameters/risk factors to corresponding PSDs. The PSDs may each be a normal distribution, a Poisson distribution, a binomial distribution, an exponential distribution, or other PSD. As an example, when network traffic between one or more user/client computers and one or more cloud applications is monitored, a logarithmic (or LOG) normal distribution is used. The domain knowledge relates the risk factor of an amount of network traffic to a LOG normal distribution because the LOG normal distribution most closely matches a distribution of network traffic data.

As an example, an amount of data downloaded from a specific cloud application by each user/client computer of an organization may be monitored. The user/client computers may download a certain amount of data over a predetermined period of time. These values may be tabulated and/or collected to provide a distribution of data. A mean and a variance of this data may be determined based on the selected PSD. The mean and variance are parameters that may be determined for each baseline.

At 208, the security application 42 via the baseline code 48 determines one or more baselines of behavior based on the selected one or more parameters and/or risk factors and the selected one or more PSDs. Each of the baselines may be for one or more users, one or more client computers, users/client computers of an organization, a predetermined group of users/client computers, one or more cloud applications, and/or one or more types of cloud applications. Examples of types of cloud applications are data storage applications, productivity applications, etc. The baselines are created by fitting the data collected for the selected one or more parameters to the selected one or more PSDs. In one embodiment, the data is fitted for a type of baseline and a corresponding association set identifier. The association set identifier may identify the one or more users, one or more client computers, one or more cloud applications, the one or more types of cloud applications, the organization and/or the predetermined groups.

At 210, the security application 42 via the baseline code 48 determines whether another baseline is to be determined. If another baseline is to be determined, operation 204 is performed, otherwise operation 212 is performed.

At 212, the security application 42 via the anomaly detection code 50 detects one or more anomalies based on the baselines and the selected one or more parameters and/or risk factors. Different types of anomalies may be detected. Example anomalies are: a sudden increase in an amount of upload data, a number of login failures, an amount of download data, and/or a number of transactions of a particular user on a particular cloud application; a sudden increase in an amount of upload data, an amount of download data, and/or a number of transactions of users on a particular cloud application; a particular user uploading and/or downloading a predetermined amount more data than other users for a particular cloud application; a user conducting a predetermined amount more transactions than other users for a particular cloud application; a sudden increase in a number of users using a particular cloud application; and/or other anomalies. In one embodiment, the security application 42 determines likelihood that values of the selected one or more parameters are to occur based on the baselines. For example, if a difference between a value and a corresponding mean is greater than a predetermined amount and the variance is low, then the value may be identified as an anomaly. If the difference between the value and the mean are greater than a predetermined amount and the variance is high, then the value may not be identified as an anomaly.

At 214, the security application 42 via the anomaly detection code 50 stores the information corresponding to the identified anomalies in the memory 44. This information (or anomaly data) may include a user identifier, a client computer identifier, a cloud application identifier, an organization identifier, and/or one or more of the corresponding parameters.

At 216, the security application 42 via the anomaly detection code 50 aggregates the identified anomalies corresponding to a same or similar behavior. Different types of aggregations may be performed. As a first example aggregation, an anomaly may be associated with more than one of the baselines. Instead of counting the anomaly multiple times due to the anomaly being identified in association with multiple baselines, the anomaly may be counted once. As another example aggregation, anomalies detected for a particular cloud application are grouped and may be counted a predetermined number of times. In another example, anomalies detected for a particular user and/or client computer are grouped and may be counted a predetermined number of times. In yet another example, anomalies for a particular organization and/or predetermined group of users/client computers are grouped and may be counted a predetermined number of times. In another embodiment, the detected anomalies are aggregated, such that all anomalies associated with a particular cloud application for a same period of time are joined together in a group.

At 218, the security application 42 stores aggregated anomaly data in the memory 44. The aggregated anomaly data may include values and/or information indicating the user, the client computer, the cloud application, the type of cloud application, the organization, the predetermined group, and/or the values of the one or more parameters associated with the aggregated anomaly. The aggregated anomaly data may identify the group, the number of baselines, and/or the times that the values of the one or more parameters were detected during operation 212 as being an anomaly.

At 220, the security application 42 via the risk code 54 determines risk values for the aggregated anomalies based on the aggregated anomaly data. This may include determining probabilities that aggregated anomalies are to occur based on the baselines, the means, differences between the means and the values of the parameters of the aggregated anomalies, and/or the variance values. The security application 42 determines a likelihood that an aggregated anomaly (or corresponding parameter and/or risk factor value) is to occur. The larger the likelihood, the larger the risk value. The values of the parameters of the aggregated anomalies may be weighted based on the type of aggregation. The unweighted aggregated anomalies and/or weighted aggregated anomalies are stored as aggregated anomaly data. The larger the weighting, the more likely the parameter and/or risk factor of the aggregated anomaly is a concern and/or associated with malicious activity.

At 222, the security application 42 via the countermeasure code 56 determines whether the one or more risk values are greater than corresponding predetermined thresholds and/or outside corresponding predetermined ranges. If the one or more risk values are greater than corresponding predetermined thresholds and/or outside corresponding predetermined ranges, operation 224 is performed, otherwise operation 226 may be performed.

At 224, the security application 42 via the countermeasure code 56 performs one or more countermeasures. As a first countermeasure, statistics are reported, which may include reporting the selected parameters and/or risk factors, identified anomalies, determined aggregated anomalies, risk values, user identifier, client computer identifier and/or address, cloud application identifier, type of cloud application, organization identifier, identifier of predetermined group, and/or other related statistic information. This information may be reported to corresponding users, client computers, owners and/or representatives of an organization, owners of VMs and/or PMs of cloud applications, and/or representatives of a service provider of the security application 42 and/or the cloud applications. As another countermeasure, the security application 42 may alert a user, prevent the user from accessing one or more cloud applications from any of the client computers 12, and/or limit access of the user to the one or more cloud applications. As another countermeasure, the security application 42 may alert a client computer, prevent the client computer from accessing one or more cloud applications, and/or limit access of the client computer to the one or more cloud applications. As yet another example, the user and/or the client computer may be limited to operating the one or more cloud applications is a safe operating mode with limited functions. As another countermeasure, the security application 42 may provide owners of VMs and/or PMs with an alert and the statistic information. As another countermeasure, the security application 42 may provide a representative and/or owner of an organization and/or a service provider with an alert and the statistic information. In one embodiment, security alerts are generated for the riskiest anomaly groups.

At 226, the security application 42 via the countermeasure code 56 reports the statistic information to corresponding users, client computers, owners of VMs and/or PMs of cloud applications, owners and/or representatives of an organization, and/or representatives of a service provider of the security application 42 and/or the cloud applications. The method may end at 228.

Figure 4:
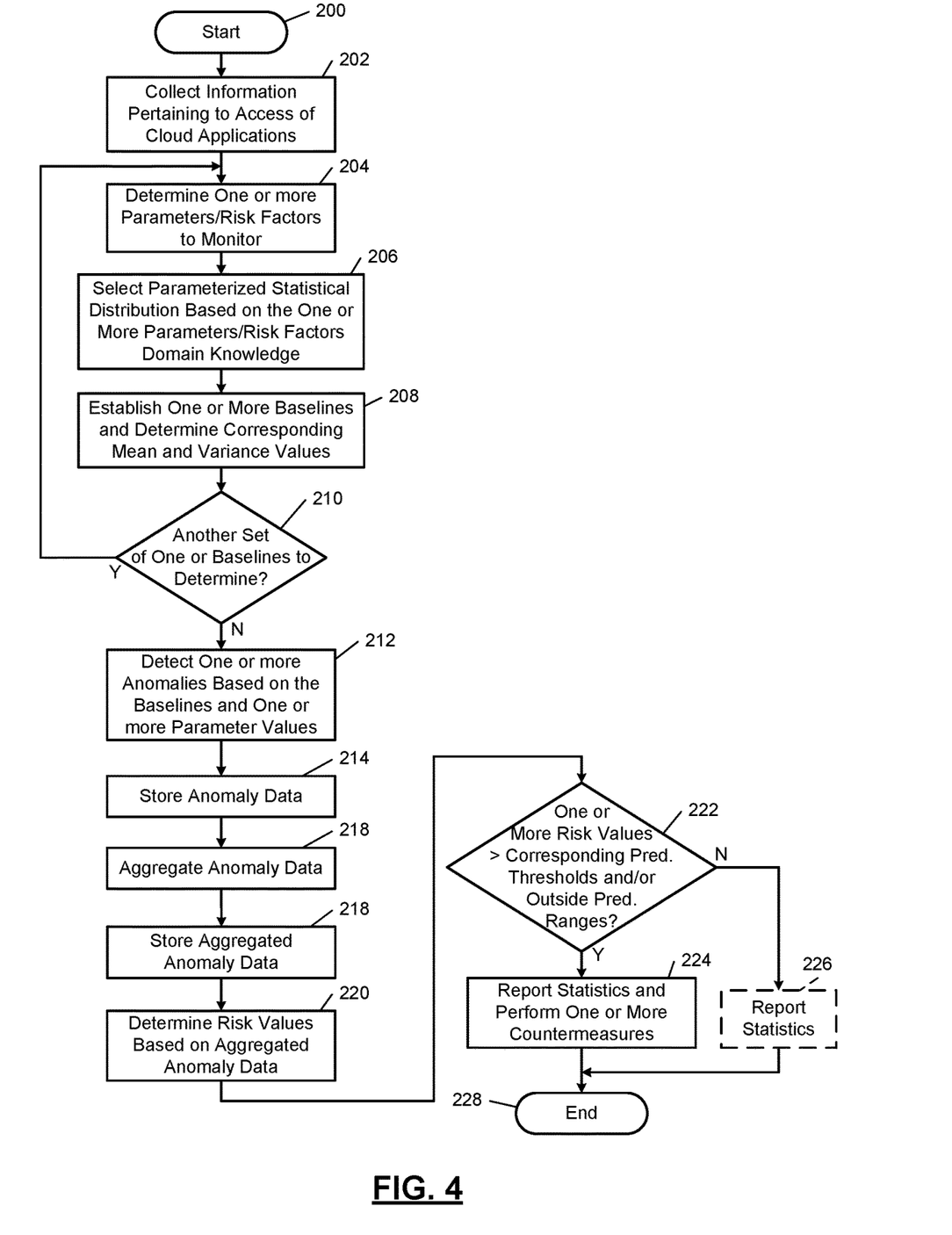
FIG. 4 illustrates security method in accordance with an embodiment of the present disclosure.

The above-described operations of FIG. 4 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

Referring to FIG. 1, in one embodiment, the security application 42 monitors activity of the $VM_{1-N}$ and PMs by monitoring information, such as data, logs, parameters, and risk factors, associated with the packets transmitted to/from the $VM_{1-N}$ and the PMs. Based on the information received from the proxies 16, gateways 18, and firewalls 30, the security application 42 determines whether one or more of the users and/or client computers are attacking one or more of the cloud applications and/or corresponding VMs, PMs, and server computers. The security application 42 informs the owners of the VMs and PMs of malicious activity. This allows the owners, the VMs, and/or the PMs to take appropriate actions to prevent further attacks on and/or to block access to the cloud applications. Although the security application 42 is shown as being implemented in the server computer 24, the security application 42 may be implemented in the same server computer as one or more of the $VM_{1-N}$.

The above-described examples allow for risky behavior to be identified and reported. The examples are able to identify anomalies associated with cloud application access, for example, when a user is uploading an unusual amount of data to a cloud application or when multiple users are accessing a newly introduced cloud application.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

A processor may refer to a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The processor may include one or more interface circuits. In some examples, the interface circuits may include wired or wireless interfaces that are connected to a local area network (LAN), the Internet, a wide area network (WAN), or combinations thereof. The functionality of any given processor of the present disclosure may be distributed among multiple circuits that are connected via interface circuits. For example, multiple circuits may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple circuits. The term group processor circuit encompasses a processor circuit that, in combination with additional processor circuits, executes some or all code from one or more circuits. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple circuits. The term group memory circuit encompasses a memory circuit that, in combination with additional memories, stores some or all code from one or more circuits.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element; such as by encode instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An anomaly detection system comprising:
a processor;
a memory; and
a security application stored in the memory and including instructions, which are executable by the processor and are configured to:
collect information of behavior data for a plurality of users of an organization accessing one or more cloud application(s) via a distributed network, wherein the behavior data includes tracked information tracked over time for the plurality of users, and wherein the one or more cloud application(s) are implemented on one or more server computer(s) of a service provider;
establish a plurality of baselines for each of the plurality of users and for each of the one or more cloud application(s) or types of cloud applications of the organization;
detect anomalies based on the plurality of baselines;
provide aggregated anomaly data by aggregating the anomalies (i) corresponding to two or more of the plurality of baselines and a same behavior, or (ii) corresponding to multiple users of a same cloud application during a same period of time,
wherein the aggregated anomaly data includes weighted values describing the aggregated anomalies, with higher weights of the weighted values indicating higher likelihoods that the aggregated anomaly data is associated with malicious activity,
wherein multiple different types of aggregations are selectably performable to aggregate the anomalies, each of the multiple different types of aggregations being associated with a corresponding weight used to weight the weighted values, and
wherein determining which specific weight to apply to the weighted values is based on which particular type of aggregation included within the multiple different types of aggregations is selected to aggregate the anomalies;
determine a risk value based on the aggregated anomaly data; and
perform a countermeasure based on the risk value.

2. The anomaly detection system of claim 1, wherein:
the security application collects the information by requesting logs from at least one of a proxy, a gateway, or a firewall; and
the logs include fields indicating access periods of the one or more cloud application(s), Internet protocol addresses of client computers of the plurality of users, usernames of the plurality of users, names of the one or more cloud application(s), volumes of data transferred between the client computers and machines of the one or more cloud application(s), and numbers of transactions between the client computers and the machines of the one or more cloud application(s).

3. The anomaly detection system of claim 1, wherein the security application, in establishing the plurality of baselines:
selects the tracked information of the behavior data to monitor;
selects a parameterized statistical distribution from a family of distributions based on the tracked information;
fits values of the tracked information provided from the behavior data to the selected parameterized statistical distribution; and
determines a mean and a variance based on the fitted values.

4. The anomaly detection system of claim 3, wherein the security application detects the anomalies based on the values of the tracked information, the mean and the variance.

5. The anomaly detection system of claim 3, wherein the security application, in determining the risk value, determines a probability that the aggregated anomaly data is to occur based on the plurality of baselines, the mean, a difference between the mean and the aggregated anomaly data, and the variance.

6. The anomaly detection system of claim 1, wherein the security application aggregates the anomalies corresponding to the two or more of the plurality of baselines to provide the aggregated anomaly data.

7. The anomaly detection system of claim 1, wherein the security application aggregates the anomalies corresponding to the multiple users of the same cloud application during the same period of time to provide the aggregated anomaly data.

8. The anomaly detection system of claim 1, wherein the countermeasure includes:
alerting one of the plurality of users, a client computer, an owner of a machine executing a cloud application associated with the aggregated anomaly data, or a representative of a service provider of the cloud application associated with the aggregated anomaly data, wherein the one or more cloud application(s) include the cloud application associated with the aggregated anomaly data; and
preventing or limiting access for one of the plurality of users to the cloud application associated with the aggregated anomaly data.

9. The anomaly detection system of claim 1, wherein collecting the information of the behavior data for the plurality of users is performed by determining one or more parameter(s) to monitor and requesting the one or more parameter(s) from a firewall.

10. An anomaly detection system comprising:
a processor;
a memory; and
a security application stored in the memory and including instructions, which are executable by the processor and are configured to:
collect information of behavior data for a plurality of client computers of an organization accessing one or more cloud application(s) via a distributed network, wherein the behavior data includes tracked information tracked over time for the plurality of client computers, and wherein the one or more cloud application(s) are implemented on one or more server computer(s) of a service provider;
establish a plurality of baselines for each of the plurality of client computers and for each of the one or more cloud application(s) or types of cloud applications of the organization;
detect anomalies based on the plurality of baselines;
provide aggregated anomaly data by aggregating the anomalies (i) corresponding to two or more of the plurality of baselines and a same behavior, or (ii) corresponding to multiple client computers accessing a same cloud application during a same period of time,
wherein the aggregated anomaly data includes weighted values describing the aggregated anomalies, with higher weights of the weighted values indicating higher likelihoods that the aggregated anomaly data is associated with malicious activity,
wherein multiple different types of aggregations are selectably performable to aggregate the anomalies, each of the multiple different types of aggregations being associated with a corresponding weight used to weight the weighted values, and
wherein determining which specific weight to apply to the weighted values is based on which particular type of aggregation included within the multiple different types of aggregations is selected to aggregate the anomalies;
determine a risk value based on the aggregated anomaly data; and
perform a countermeasure based on the risk value.

11. The anomaly detection system of claim 10, wherein the security application, in establishing the plurality of baselines:
selects the tracked information of the behavior data to monitor;
selects a parameterized statistical distribution from a family of distributions based on the tracked information;
fits values of the tracked information provided from the behavior data to the selected parameterized statistical distribution; and
determines a mean and a variance based on the fitted values.

12. The anomaly detection system of claim 11, wherein the security application detects the anomalies based on the values of the tracked information, the mean and the variance.

13. The anomaly detection system of claim 11, wherein the security application, in determining the risk value, determines a probability that the aggregated anomaly data is to occur based on the plurality of baselines, the mean, a difference between the mean and the aggregated anomaly data, and the variance.

14. The anomaly detection system of claim 10, wherein the security application aggregates the anomalies corresponding to the two or more of the plurality of baselines to provide the aggregated anomaly data.

15. The anomaly detection system of claim 10, wherein the security application aggregates the anomalies corresponding to the multiple client computers of the same cloud application during the same period of time to provide the aggregated anomaly data.

16. One or more computer readable hardware storage device(s) having stored thereon computer-executable instructions that are executable by one or more processor(s) of a computer system to cause the computer system to detect an anomaly associated with access of a cloud application by causing the computer system to:
- collect information of behavior data for a plurality of users of an organization accessing one or more cloud application(s) via a distributed network, wherein the behavior data includes tracked information tracked over time for the plurality of users, and wherein the one or more cloud application(s) are implemented on one or more server computer(s) of a service provider;
- establish a plurality of baselines for each of the plurality of users and for each of the one or more cloud application(s) or types of cloud applications of the organization;
- detect anomalies based on the plurality of baselines;
- provide aggregated anomaly data by aggregating the anomalies (i) corresponding to two or more of the plurality of baselines and a same behavior, or (ii) corresponding to multiple users of a same cloud application during a same period of time,
  - wherein the aggregated anomaly data includes weighted values describing the aggregated anomalies, with higher weights of the weighted values indicating higher likelihoods that the aggregated anomaly data is associated with malicious activity,
  - wherein multiple different types of aggregations are selectably performable to aggregate the anomalies, each of the multiple different types of aggregations being associated with a corresponding weight used to weight the weighted values, and
  - wherein determining which specific weight to apply to the weighted values is based on which particular type of aggregation included within the multiple different types of aggregations is selected to aggregate the anomalies;
- determine a risk value based on the aggregated anomaly data; and
- perform a countermeasure based on the risk value.

17. The one or more computer-readable hardware storage device(s) of claim 16, wherein establishing the plurality of baselines includes:
- selecting the tracked information of the behavior data to monitor;
- selecting a parameterized statistical distribution from a family of distributions based on the tracked information;
- fitting values of the tracked information provided from the behavior data to the selected parameterized statistical distribution; and
- determining a mean and a variance based on the fitted values.

18. The one or more computer-readable hardware storage device(s) of claim 17, wherein the anomalies are detected based on the values of the tracked information, the mean and the variance.

19. The one or more computer-readable hardware storage device(s) of claim 17, wherein determining the risk value includes determining a probability that the aggregated anomaly data is to occur based on the plurality of baselines, the mean, a difference between the mean and the aggregated anomaly data, and the variance.

20. The one or more computer-readable hardware storage device(s) of claim 16, wherein the anomalies corresponding to the two or more of the plurality of baselines are aggregated to provide the aggregated anomaly data.

21. The one or more computer-readable hardware storage device(s) of claim 16, wherein the anomalies corresponding to the multiple users of the same cloud application during the same period of time are aggregated to provide the aggregated anomaly data.

* * * * *